United States Patent Office

Re. 27,447
Reissued Aug. 1, 1972

27,447

PROCESS OF USING A LOW CARBON STEEL COMPOSITION IN A CONTINUOUS CASTING PROCESS

John H. Richards, Penn Hills Township, Pa., assignor to United States Steel Corporation No Drawing. Original No. 3,412,781, dated Nov. 26, 1968, Ser. No. 489,060, Sept. 21, 1965. Application for reissue July 13, 1970, Ser. No. 54,669
Int. Cl. B23k *19/00*
U.S. Cl. 29—527.7 8 Claims

Matter enclosed in heavy brackets [ ] appears in the original patent but forms no part of this reissue specification; matter printed in italics indicates the additions made by reissue.

ABSTRACT OF THE DISCLOSURE

A process of using a low carbon steel composition in a method for the continuous casting of steel which comprises introducing to a casting mold a steel whose composition is adjusted to contain 0.01 to 0.08% carbon, 0.20 to 0.60% manganese, 0.03 to 0.08% silicon, not over 0.015% aluminum, and the balance essentially iron and incidental impurities and continuously casting same.

This invention relates to processes for the continuous casting of steel and more particularly to processes in which the composition of the molten steel is adjusted prior to casting in order to give cast slabs having good mechanical properties and especially suited for flat rolling.

A large part of the demand for flat rolled steel, such as sheet and tinplate, has been satisfied by rimmed drawing quality steel produced in conventional ingot molds. Steel of this type has customarily had a low carbon content of about 0.03 to about 0.06% and a silicon content not over 0.02%. Violent rimming action in the ingot mold with evolution of large quantities of gas is characteristic of rimmed steel casting.

The steel compositions customarily used for the production of rimmed steel do not lend themselves to the continuous casting process because of violent rimming action. Evolution of more than minute quantities of gas in a continuous casting mold results in blow holes and cavities within the casting, because the gas does not have an opportunity to escape from a continuously formed casting as it has in the case of a conventional ingot. Hence it is desirable to form continuous steel castings from steel having a composition which will cause little or no gas evolution in the mold. At the same time it is imperative that the steel produced in the continuous casting mold have mechanical properties at least as good as those of rimmed drawing quality steel. Furthermore, the quantity of metal oxides, such as iron oxide, alumina, aid silica, must be held to a minimum because these oxides tend to accumulate along the surfaces of continuously formed castings and produce castings of inferior quality which require considerable conditioning before they can be rolled.

It is can object of this invention to provide a steel composition especially adapted for the continuous casting of slabs which are suitable for rolling into flat rolled products.

It is a further object of this invention to provide a continuous casting process in which the liberation of gas in the mold is kept to a minimum.

It is a further object of this invention to provide a continuous process for casting slabs having mechanical properties equal to or better than those of rimmed drawing quality steel.

It is a still further object of this invention to provide a continuous process for casting slabs having mechanica properties equal to or better than those of rimmed draw ing quality steel.

It is a still further object of this invention to provid a continuous casting process in which the quantity o metal oxides introduced into the mold is minimized.

These and other objects will be apparent from the dis closure which follows.

According to this invention the composition of a fur nace melt from a steel making furnace is adjusted by th addition of manganese and silicon, and aluminum if de sired, to give molten steel having a composition a follows:

| | Percen |
|---|---|
| C | .01–.0 |
| Mn | .20–.6 |
| Si | .03–.0 |
| Al | Not over .01 |

Fe and incidental impurities balance.

The molten steel of the above composition is then intro duced into a continuous casting mold. Best results ar obtained with a molten steel of the above compositio in which the sum of the silicon content and 0.1 times th manganese content is not less than the carbon content.

The carbon content of the molten steel should not b less than .01%, because the oxygen content of steel i excessively high for continuous casting when the carbo content drops below .01%. Also, the lining life of a stee making furnace is shortened when the carbon content i below .01%. The carbon content of molten steel shoul not exceed .08%, because sheet material rolled from cast ings containing more than .08% carbon become exces sively hard and therefore unsuited for deep drawin applications when annealed according to standard pro cedures.

The manganese and silicon ranges for the molten stee are chosen because of the synergistic effect of thes amounts in preventing pinhole porosity of steel whos carbon content is in the range of .01% to .08%. Further more, the oxygen content of the steel can be estimate and controlled more reliably when the manganese conten is in the range of this invention than when the manganes content is less.

The amount of acid soluble aluminum in the steel i preferably not greater than .015%, because large amounts tend to cause the formation of excessive quanti ties of non-metallic inclusions. Furthermore the presenc of alumina in large amounts in the non-metallic inclusion is particularly undesirable because metal oxide inclusion containing large amounts of alumina tend to form massiv agglomerates rather than glassy films along the side wall of the mold as the casting descends. These massive ag glomerates are very difficult to remove by the action o the cooling water sprays below the mold, and mar a excessively large portion of the surface area of the castin so that extensive conditioning of the slab is required.

A preferred molten steel composition for continuou casting according to this invention is as follows:

| | Percen |
|---|---|
| C | .03–.0 |
| Mn | .35–.4 |
| Si | .03–.0 |
| Al | Not over .01 |

Fe and incidental impurities balance.

The sum of the silicon content and 0.1 times the manga nese content is not less than the carbon content in th preferred molten steel compositions of this invention.

Castings formed from molten steel compositions withi the above indicated preferred range give outstanding me hanical properties when finished according to standard nill finishing treatments.

Carbon levels of at least .03% are desirable because he amounts of oxygen in steel containing less than .03% arbon are frequently so high as to cause undue gas evolution in the mold and to cause the oxidation of steel and f deoxidizer elements such as manganese, aluminum and ilicon, forming excessive quantities of non-metallic inlusions. Carbon contents in the range of .03% to .06% re also desirable for best results in annealing of flat olled products such as strip obtained after the casting s rolled.

Molten steel for the present process may be obtained rom any steel making furnace, such as a basic oxygen rocess (BOP) furnace or an electric furnace, the former eing preferred. The composition of a furnace melt from basic oxygen process furnace used for making steel for he instant process is customarily as follows:

| | | |
|---|---|---|
| C | percent | .03–.06 |
| Si | do | <.02 |
| Mn | do | 0.1–0.25 |
| O | p.p.m. | 600–900 |
| S | percent | <.02 |
| P | do | <0.015 |

The standard basic oxygen furnace practice for making ow carbon steel may be used without modification. However, it is frequently advantageous to modify the customary BOP furnace practice by charging enough manganese to the furnace to obtain a residual manganese content of at least 0.1% in the furnace melt. It is essential hat the residual manganese content in the furnace melt e at least 0.10% when the sulfur content of the iron upplied to the furnace is in a normal range of from bout 0.025% to 0.050%, in order to keep the sulfur content in the furnace melt down to an acceptable amount ot greater than 0.02%. Residual manganese contents of ver 0.1% are obtained by the addition of a manganese re to the furnace charge, or by the addition of hot metal iron from the blast furnace) containing enough manganese to give the residual manganese content of at least .10%. The use of manganese ore is preferred, since high nanganese hot metal usually contains so much phosphorus as to raise the quantity of phosphorus in the steel asting above acceptable limits. The use of manganese ore nakes it possible to obtain the desired residual manganese content in the furnace melt without also obtaining an xcessively high phophorus content. Either a high grade r low grade manganese ores may be used. The amount of re added is at least about 0.1% by weight of Mn, ased on the total weight of the furnace charge. Generally large quantities are required because a large part f the manganese is lost to the furance slag.

The temperature in the furnace is customarily held within the range of 2850 to 3000° F. Temperatures above 3000° F. are to be avoided, because these high temperatures cause rapid deterioration of the furnace lining, resulting in the presence of excessive quantities of refractory xide slag in the furnace melt.

It is impossible to produce a furnace melt having the lesired composition for introduction into a continuous asting mold according to the conventional process. The quilibrium relationships existing between carbon and ilicon at the usual furnace temperatures require that ither the carbon content be above the acceptable maximum of 0.08% or that the silicon content be below the ninmum of 0.03%. It is necessary to form a furnace nelt having the desired carbon content (which cannot be atisfactorily reduced in the molten steel after it has been apped from the furnace) and to add silicon as required o bring up the silicon content to the desired level. It is lso necessary to add manganese to bring up the content o the level desired for the purposes of this invention. A large portion of the manganese content of the molten teel introduced into the mold is added after tapping of the furnace melt, because it is impractical to charge enough manganese to a basic oxygen process furnace to furnish the desired manganese content in view of the excessive losses of manganese to furnace slag.

It will be noted that the silicon content for steels to be used in the present invention is considerably higher than the silicon content of steels used for the production of rimmed drawing quality steel. The silicon content according to the present invention is in the range of .03–.08%, while the silicon content and rimmed drawing quality steels intended for rolling into flat rolled products is customarily not allowed to exceed .02%. Surprisingly the higher content according to this invention is not detrimental but actually beneficial to the mechanical properties of the rolled steel. Furthermore, the higher silicon content is necessary in order to avoid rimming action with the production of cavities and blow holes in the continuous casting.

Manganese may be added in the ladle in the form of silicomanganese, high or medium carbon ferromanganese, or electrolytic manganese. The addition of silicomanganese also supplies the entire quantity of silicon which must be added in order to bring the molten steel composition up to the desired silicon level of 0.03–0.08%. Customarily about 6 to 10 lbs. per ton of silicomanganese and about 2 to 4 lbs. per ton of medium carbon ferromanganese are added in order to supply the necessary manganese and silicon to the molten steel. Instead of adding medium carbon manganese, either high carbon manganese or electrolytic manganese may be added. Frequently the amounts of high carbon manganese required are somewhat less than the amounts of medium carbon ferromanganese normally required, being only about 1 to 2 lbs. per ton in most instances.

The silicomanganese and the ferromanganese are most conveniently added to the molten steel during the filling of the tapping ladle with the furnace melt obtained in the steel making furnace. Best results are obtained when the silicomanganese and ferromanganese are added during the filling of the middle third of the ladle.

In addition to manganese and silicon, it is frequently desirable to add small amounts of aluminum to the tapping ladle in order to improve the characteristics of the nonmetallic inclusions so as to minimize conditioning of continuously cast slabs formed in the present process. To this end it has been found that the addition of about ½ to about 1½ lbs. per ton of aluminum in the ladle simplifies the problems of inclusions from the solidified slabs.

After the composition of the steel has been adjusted so that it is within either the broad or preferred range described above, the steel is then poured into the upper end of an open-ended tubular water cooled continuous casting mold. Solidification of the steel is initiated in the mold. A casting having a solidified skin surrounding a liquid metal core is withdrawn downwardly from the mold. Solidification of the entire cross-sectional area is accomplished by means of water sprays located below the mold, as is conventional in the art.

The solidified slab may be further treated as for example by hot rolling, in order to obtain flat rolled products such as strip. These flat rolled products may be annealed and coiled and may be finished according to conventional metal working techniques.

This invention will now be described with reference to specific embodiments thereof as illustrated in the examples which follow.

EXAMPLE

The following standard procedure was used in all of the heats described in this example:

A steel furnace melt was tapped from a basic oxygen process (BOP) furnace into a tapping ladle. The steel furnace melt was made according to a modified standard BOP furnace practice for making low carbon steel, using 75% by weight of hot metal (iron from a blast furnace)

and 25% by weight of scrap, plus 10 to 20 pounds per ton of a manganese ore containing about 50% Mn. The furnace practice was standard except for the addition of the manganese ore. The carbon and manganese contents of the steel as tapped from the furnace were determined. The furnace melt contained insufficient manganese and silicon, to give a steel having the desired composition for molding in a continuous casting mold. Hence manganese and silicon were added to the steel in the tapping ladle. Manganese was added in the form of silicomanganese and either medium carbon ferromanganese, high carbon, ferromanganese, or electrolytic manganese as indicated in each heat. The silicomanganese also supplied the silicon required. Aluminum was also added to the tapping ladle in the amounts indicated. The addition of manganese, silicon and aluminum to the tapping ladle deoxidizes the steel sufficiently to avoid blow holes and other evidences of an "open" or unkilled steel in the mold. The carbon and manganese contents of the furnace melt, and the amounts of silicomanganese, ferromanganese, and aluminum added to the tapping ladle are indicated in Table I below.

TABLE I

| Heat No. | Slab No. | Tap composition, percent | | Ladle addition, lbs./ton | | |
|---|---|---|---|---|---|---|
| | | C | Mn | Medium carbon ferromanganese | Silicomanganese | Aluminum |
| 1 | 2 | 0.037 | 0.15 | *2.22 | 8.88 | 1.42 |
| 2 | 5 | 0.024 | 0.14 | ---------- | 8.69 | 1.39 |
| 3 | 1 | 0.040 | 0.18 | 2.66 | 6.39 | 8.79 |
| 4 | 5 | 0.038 | 0.16 | 2.84 | 6.80 | 0.93 |
| 5 | 1 | 0.040 | 0.25 | 2.77 | 6.64 | 0.91 |
| | 2 | 0.040 | 0.25 | 2.77 | 6.64 | 0.91 |
| | 3 | 0.040 | 0.25 | 2.77 | 6.64 | 0.91 |
| | 4 | 0.040 | 0.25 | 2.77 | 6.64 | 0.91 |
| | 5 | 0.040 | 0.25 | 2.77 | 6.64 | 0.91 |
| 6 | 1 | 0.036 | 0.17 | 2.35 | 7.05 | 1.41 |
| | 2 | 0.036 | 0.17 | 2.35 | 7.05 | 1.41 |
| | 3 | 0.036 | 0.17 | 2.35 | 7.05 | 1.41 |
| | 4 | 0.036 | 0.17 | 2.35 | 7.05 | 1.41 |
| | 5 | 0.036 | 0.17 | 2.35 | 7.05 | 1.41 |
| | 6 | 0.036 | 0.17 | 2.35 | 7.05 | 1.41 |

* Electrolytic manganese.

Molten steel was poured from the ladle into the upper end of an open-ended water cooled tubular continuous casting mold while the lower end of the mold was closed with a starter bar. Partial solidification of the steel was initiated in the mold. When the mold was substantially filled with molten steel, the starter bar and the attached casting having a solidified shell and a molten core were lowered below the mold as pouring of molten metal from the ladle was continued. The cast was cooled by spraying water on its surface as it descended below the mold until it was completely solidified. The casting was cut into slabs of predetermined length. These slabs were allowed to cool to room temperature. Samples of these slabs were taken for analysis of carbon, manganese, silicon, aluminum and oxygen. These analyses are reported in Table II below.

A small amount of scum consisting essentially of iron oxide and of the oxides of the deoxidizing elements (manganese, silicon and aluminum) was observed on the molten metal surface in the mold in each heat, the amount varying somewhat from heat to heat. Most of this scum descended with the casting along the side walls thereof, and was removed in the water spray cooling zone. The metal slabs were conditioned by scarfing in order to remove surface imperfections, most of which resulted from mechanical defects resulting from handling the last slab. The rather small percentage of the surface area which required conditioning is indicated in Table II below.

TABLE II

| Heat No. | Slab No. | Steel composition, percent (slab analysis) | | | | | Percent conditioning |
|---|---|---|---|---|---|---|---|
| | | C | Mn | Si | Total Al | $O_2$, p.p.m. | |
| 1 | 2 | 0.038 | 0.47 | 0.032 | 0.004 | 166 | 15 |
| 2 | 5 | 0.048 | 0.33 | 0.040 | 0.006 | 197 | 8 |
| 3 | 1 | 0.060 | 0.45 | 0.038 | 0.005 | 297 | 5 |
| 4 | 5 | 0.050 | 0.36 | 0.024 | 0.011 | 212 | 5 |
| 5 | 1 | 0.055 | 0.48 | 0.040 | 0.008 | 171 | 2 |
| | 2 | 0.555 | 0.48 | 0.040 | 0.008 | | 1 |
| | 3 | 0.055 | 0.48 | 0.040 | 0.008 | | 1 |
| | 4 | 0.055 | 0.48 | 0.040 | 0.008 | | 2 |
| | 5 | 0.0055 | 0.48 | 0.040 | 0.008 | | 3 |
| 6 | 1 | 0.050 | 0.40 | 0.040 | 0.005 | 217 | 1 |
| | 2 | 0.050 | 0.40 | 0.004 | 0.005 | | 2 |
| | 3 | 0.050 | 0.40 | 0.040 | 0.005 | | 3 |
| | 4 | 0.500 | 0.40 | 0.040 | 0.005 | | 8 |
| | 5 | 0.050 | 0.40 | 0.040 | 0.005 | | 4 |
| | 6 | 0.050 | 0.40 | 0.040 | 0.005 | | 2 |

The cold slabs were reheated and hot rolled in a hot strip mill. This mill included a plurality of roughing stands and a plurality of finishing stands followed by a coiler. Temperatures of the steel were taken immediately after the last roughing stand, immediately after the last finishing stand, and immediately before the coiler. These temperatures were reported in Table III below as roughing, finishing, and coiling temperatures respectively.

The hot strip coil was pickled and then cold rolled in a multiple stand cold mill. The percentage reduction in thickness (which is the difference between the initial and the final thickness divided by the initial thickness and multiplied by 100) was 61.4% in all cases.

The cold rolled strip was annealed in an inert atmosphere for the soak time and at the average soak temperature indicated in Table III below.

TABLE III

| Heat No. | Slab No. | Hot rolling data, temp., F. | | | Annealing data | |
|---|---|---|---|---|---|---|
| | | Roughing | Finish | Coiling | Soak time, hrs. | Average soak temp., F. |
| 1 | 2 | 2,015 | 1,600 | 1,180 | 18 | 1,283 |
| 2 | 5 | 2,000 | 1,615 | 1,160 | 22 | 1,280 |
| 3 | 1 | 1,990 | 1,665 | 1,170 | 24 | 1,283 |
| 4 | 5 | 1,990 | 1,665 | 1,190 | 19 | 1,283 |
| 5 | 1 | 1,960 | 1,530 | 1,160 | 21 | 1,290 |
| | 2 | 1,970 | 1,530 | 1,160 | 21 | 1,283 |
| | 3 | 1,980 | 1,530 | 1,160 | 21 | 1,283 |
| | 4 | 1,965 | 1,520 | 1,160 | 21 | 1,283 |
| | 5 | 1,970 | 1,530 | 1,160 | 21 | 1,283 |
| 6 | 1 | 1,880 | 1,600 | 1,150 | 22 | 1,283 |
| | 2 | 1,915 | 1,600 | 1,155 | 17 | 1,265 |
| | 3 | 1,950 | 1,610 | 1,170 | 22 | 1,283 |
| | 4 | 1,950 | 1,610 | 1,160 | 22 | 1,283 |
| | 5 | 1,900 | 1,570 | 1,150 | 22 | 1,283 |
| | 6 | 1,920 | 1,610 | 1,170 | 29 | 1,290 |

Lower yield point, tensile strength, and elongation determinations were made in the longitudinal direction according to standard ASTM procedures. Results are reported in Table IV below.

TABLE IV

| o. | Slab No. | Lower yield, p.s.i., longitudinal | Tensile strength, p.s.i., longitudinal | Elong. in 2 inches, percent, longitudinal |
|---|---|---|---|---|
| ------ | 2 | 25,765 | 45,635 | 42 |
| ------ | 5 | 25,400 | 45,745 | 42 |
| ------ | 1 | 26,300 | 46,670 | 43 |
| ------ | 5 | 25,730 | 45,725 | 43 |
| ------ | 1 | 27,400 | 48,290 | 41 |
| | 2 | 24,705 | 44,990 | 39 |
| | 3 | 26,165 | 46,715 | 42 |
| | 4 | 25,875 | 46,355 | 43 |
| | 5 | 24,960 | 45,115 | 42 |
| ------- | 1 | 26,560 | 47,050 | 43 |
| | 2 | 29,025 | 46,525 | 40 |
| | 3 | 25,075 | 44,420 | 41 |
| | 4 | 28,115 | 46,180 | 43 |
| | 5 | 25,960 | 46,810 | 44 |
| | 6 | 27,105 | 46,065 | 42 |

The above steels are equal to or superior to rimmed )Q steel in their ability to be drawn into shapes without reaking.

I claim:

1. A process of using a steel composition containing

| | Percent |
|---|---|
| : | .01–.08 |
| In | .20–.60 |
| i | .03–.08 |
| l | [not over] .004–.015 |

e and incidental impurities balance.

hich comprises the steps of adjusting a steel furnace ıelt to said composition and casting said composition ɔntinuously.

2. A process according to claim 1 in which the sum f the silicon content and 0.1 times the manganese con- ɜnt of said melt is not less than the carbon content.

3. A process of using a steel composition containing

| | Percent |
|---|---|
| : | .03–.06 |
| In | .35–.45 |
| i | .03–.08 |
| l | 0.004–.015 |

balance substantially iron and incidental impurities, comprising the steps of adjusting a steel furnace melt to said composition and casting said steel continuously.

4. A process according to claim 1 in which the residual manganese content of said furnace melt is not less than 0.10%.

5. A process according to claim 1 in which said furnace melt is tapped from a basic oxygen process steel making furnace.

6. A process according to claim 5 in which manganese ore in an amount of at least 0.1% by weight of Mn, based on the total weight of the furnace charge, is charged to said furnace.

7. A process according to claim 1 in which said melt contains not over .02% sulfur.

8. A process according to claim 1 including the steps of forming a solidified steel slab in said mold and rolling said slab into a flat rolled product.

References Cited

The following references, cited by the Examiner, are of record in the patented file of this patent or the original patent.

UNITED STATES PATENTS

| | | | |
|---|---|---|---|
| 3,357,822 | 12/1967 | Miyoshi et al. | 148—36 X |
| 2,983,598 | 5/1961 | Wheatley | 164—57 |
| 3,215,567 | 11/1965 | Yoshida | 148—31 |
| 3,262,821 | 7/1966 | Yoshida | 148—12.11 |

OTHER REFERENCES

F. Jaicks et al.: "Continuous Casting of Three Types of Low Carbon Steel," Journal of Metals, 1057–1072, August 1957.

Metals Handbook, 1939 edition, pp. 1243 and 1244.

JOHN F. CAMPBELL, Primary Examiner

D. C. REILEY, III, Assistant Examiner

U.S. Cl. X.R.

29—DIG. 5; 75—123; 148—36; 164—57, 76, 82